3,782,895
ELECTROSTATIC DYEING WITH MICROCAPSULES CONTAINING DYES IN LIQUIDS OF HIGH DIELECTRIC CONSTANT
Hendrik Goorhuis, Binningen, Basel-Land, Switzerland, assignor to Sandoz Ltd., Basel, Switzerland
No Drawing. Filed Nov. 16, 1971, Ser. No. 199,376
Claims priority, application Switzerland, Dec. 15, 1970, 18,558/70
Int. Cl. G03g *3/00*
U.S. Cl. 8—2                                                   11 Claims

ABSTRACT OF THE DISCLOSURE

A process for the dyeing and printing of textiles which is characterized by the use of dyeing preparations in the form of particles consisting of a highly resistive, high molecular weight polymer (A) as carrier, in which are encapsulated a dye (B) and a liquid (C) with a high dielectric constant in which the polymer (A) is virtually free from swelling, and optionally known assistants, dispersing agents and solvents, said dyeing preparations being applied to the textile substrate with the aid of an electrostatic field and then fixed.

---

This invention provides a method for the deposition of pulverulent dyeing preparations on textiles, including nonwovens, by means of an electrostatic field.

A related technique used mainly for printing paper is known, the principle of which is to transfer the printing ink to the paper by means of an electrostatic field acting vertically to the plane of the paper, the printing screen being set not in immediate contact with the paper but at some distance from it. The application of this technique to textile printing necessitates the adoption of special measures, notably the use of textile dyes which have to be fixed on the textile fibre by suitable methods. As is known, pigments can be fixed with binders such as synthetic resins, but this type of fixation is generally undesirable because it has an unduly adverse effect on the handle of the textiles and leads to unsatisfactory fastness properties. It has been found further on that normal textile dyes are not applicable by the aforementioned technique as they lack the necessary electrical and dielectrical properties. Further, it has been recognized that the adaption of the technique to textile printing demands a specific system of operating, which again makes special requirements on the dyeing preparations.

In the published Swiss patent application 5,970/63 dyeing preparations in particle form are disclosed which consist of dry dyes encapsulated in dielectrical material serving as carriers. Natural and synthetic resins of various types are named as suitable dye carriers.

Surprisingly, it has been found by the applicant that when the dye, instead of being encapsulated in the dry state, is dispersed and/or dissolved in a liquid having a high dielectric constant prior to encapsulation in the carrier material, the obtained dye particles move towards the electrode with greater accuracy of aim and so give more sharply defined prints; expressed in other terms, results of equally good quality are obtainable at lower field intensity. This invention thus relates to a process for the dyeing and printing of textiles which is characterized by the use of dyeing preparations in the form of particles consisting of a highly resistive high molecular weight polymer (A) as carrier, in which are encapsulated a dye (B) and a liquid (C) with a high dielectric constant in which the polymer (A) is virtually free from swelling, and optionally known assistants, dispersing agents and solvents, said dyeing preparation being applied to the textile substrate with the aid of an electrostatic field and then fixed.

The invention comprises further the textiles dyed or printed with these dyeing preparations.

The dyeing preparations, according to the invention, are deposited and fixed on the textiles either by means of a screen set at a predetermined distance from the textile surface and an electrostatic field acting vertically to the screen and the textile, or by a xerographic method in which a latent image of the pattern is produced by the localized action of an electrostatic field and a photo semiconductor. After the pattern has been produced by the deposited dye it is fixed on or in the fibre. Only in exceptional cases is the textile washed off afterwards.

The pulverulent dyes (B) may belong to various classes, the choice of dye being determined by the nature of the textile substrate. Premetallized dyes (1:1 and 2:1 dye: metal complexes) are suitable for synthetic polyamide materials; the majority of these belong to the monoazo series, a lesser number to the anthraquinone series, and they may contain or be free from water solubilizing groups such as sulphonic acid and carboxyl groups. Many of these dyes contain sulphonamide groups. Acid wool dyes also are suitable for synthetic polyamide textiles, including the monoazo and anthraquinone members of this class which bear water solubilizing sulphonic acid groups.

Disperse dyes are widely used for dyeing textiles of synthetic polyamide, polyester and regenerated cellulosic fibres. Their common feature is the absence of water solubilizing groups, but they are for the most part thermosoluble in synthetic polymers, notably polyesters and polyamides, and in cellulose esters. The disperse class contains dyes of the monoazo, polyazo, anthraquinone, styryl, nitro, phthaloperinone, quinophthalone, thiazine and oxazine series, with a number of vat dyes in the leuco or oxidized form. Other suitable dyes are water soluble and water insoluble sulphur dyes. For polyacrylonitrile and acrylonitrile copolymer fibres, preference is often given to basic dyes, the molecule of which is a action and which usually contain a carbonium or a quaternary nitrogen atom. Cotton textiles are dyeable with vat dye derivatives and with the reactive dyes employed for polyamide fibres.

The liquid (C), as stated above, must have a high dielectric constant, for example, between 20 and 80, but may not cause any appreciable swelling of the polymer (A). Besides water (dielectric constant approximately 80, alcohols such as methyl, ethyl and propyl alcohol or ethylene glycol or its mixtures give good service.

The dielectric carrier material (A) in which the liquid (C) is encapsulated can be selected from water insoluble film-forming polymers and copolymers which are non-swelling or virtually so, i.e. with an imbibition value of less than 5% at 20° C. and 65% relative humidity. Suitable natural resins are rosin (colophony), some rosin derivatives and combinations with phenolic or maleic resins. Other natural resins of related structure to rosin such as shellac can be used. The suitable synthetic resins include vinyl resins such as polyacrylate; polyacrylamide; non-thermosetting phenolic resins, the so-called "novolacs"; polyester resins, e.g. linear types from a dicarboxylic acid such as phthalic or sebacic acid or a divalent alcohol such as ethylene glycol; and polyamide resins such as the condensation products of sebacic acid and hexamethylene diamine.

All the aforenamed materials have the high electrical resistance necessary to effect dye transference in the electrostatic field. Further, they have the property of not inhibiting penetration of the dye into the textile fibre in the fixation phase of the process.

In many cases, however, it is advisable to add known chemical assistants, i.e. dispersing agents and/or solvents, to the mixture of dye (B) and liquid (C) in order to promote during the fixation the dye penetration in the textile substrate. Examples of such agents are urea, thiodiethylene glycol, lignin sulphonates, condensation products of alkylnaphthene sulphonates and formaldehyde and/or latent oxidizing or reducing agents, acid and alkali donors and so called dye carriers such as sodium chlorate, benzyl alcohol, ammonium salts, sodium trichloracetate, thiourea, o-phenylphenol, sodium m-nitrobenzene-sulphonate, sulphoxylates bound to aldehyde and the derivatives examinable from said sulphoxylates.

Depending on the nature of the substrate to be dyed, the dyeing preparation is formed from a solution or suspension in the liquid (C). The size of the capsules formed by the carrier material (A) may vary within wide limits, the preferred limit value being <50 microns.

To conserve the high electrical resistance of the liquid the surface of the capsules has to be completely sealed. This can be achieved by dispersing the components for encapsulation, together with any other components necessary for formation of the surface film, in a medium with which they are not miscible so that they form droplets, on which the surface film is formed by interfacial polymerization or condensation polymerization or by reaction with the elementary components present in the surrounding medium. For example, according to U.S. Pat. 3,415,758 the dye can be dissolved in water, optionally with the addition of alkylene glycol, and a solution of a polyvinyl chloride, polyvinyl alcohol or polyvinyl acetate copolymer in ethylene dichloride added with thorough stirring to give rise to particles of the desired size. Into this water-in-oil emulsion is dropped a polymer such as polydimethyl siloxane, upon which the two phases separate and embryonic capsules with an enclosing film of liquid are formed. With continued stirring, these are treated with a product to produce crosslinking of the liquid surface film, such as tetrabutyl titanate. The final capsules thus formed are isolated by filtration or centrifuging and then dried.

The dyeing preparations thus produced are deposited electrostatically by means of screens or xerography on the aforenamed textile substrates.

The polymer film can be split or melted by the application of pressure or heat (steam, dry heat or contact heat). If it is in contact with certain solvents in the vapor phase it goes into solution. The dye, together with the moist atmosphere, the solvent and other assistants present, is then in immediate contact with the substrate. Given appropriate conditions, the dye is fixed on the substrate instantaneously.

Aftertreatment is not normally necessary. Following fixation of the dye, the melted or dissolved polymer film can be left on the substrate to serve as finish, or if desired removed by a suitable cleaning treatment.

If multicolor effects are desired, preparations containing dyes of the requisite shade are deposited on the substrate one after the other and fixed simultaneously immediately afterward.

The process here disclosed is suitable for producing color effects on flat textiles of every description, notably woven piece goods, knitted fabrics and nonwovens of wool, natural and regenerated cellulosic fibres, synthetic polymer and copolymer fibres such as polyamide, polyacrylonitrile and polyester fibres, and blends of these fibres. The textiles may be pretreated or in the loom state when the process is applied.

The following examples illustrate the invention without limiting its scope. The percentages are by weight.

EXAMPLE 1

A liquid of the composition:

| | Percent |
|---|---|
| Remazol Bordeaux B (C.I. Reactive Red 49) | 3 |
| Urea | 5 |
| Sodium n-nitrobenzenesulphonate | 1 |
| Sodium alginate | 4 |
| Water | 87 | is enclosed in a polyamide film to form microcapsules with an average size of 10 microns. These capsules are mixed with an equal amount of capsules containing

| | Percent |
|---|---|
| Sodium hydroxide | 1 |
| Potassium carbonate | 2 |
| Polyvinyl alcohol | 2 |
| Water | 95 |

The mixture is electrostatically deposited on mercerized cotton fabric through a printing screen using the known technique as described, for instance, in the published Swiss application 5,970/63.

The locally printed fabric is calendered between a pair of rollers with pressure and stored for 30–60 minutes for fixation of the dye.

In comparison with the procedure described in Example 3 of the aforecited Swiss patent application, this printing procedure conforming to the present invention has these advantages: (a) no pretreatment of the fabric is necessary, (b) no subsequent heat treatment is necessary, and (c) washing off can as a rule be omitted.

EXAMPLE 2

A liquid of the composition:

| | Percent |
|---|---|
| Mixture of 30% Foron Blue S-BGL (C.I. Disperse Blue 73), 25% dispersing agent (e.g. lignin sulphonate) and 45% water | 5 |
| Urea | 2.5 |
| Ammonium sulphate | 0.5 |
| Sodium chlorate | 0.05 |
| Carboxymethyl cellulose | 1.95 |
| Water | 90 | is enclosed in a polyacrylamide film to form microcapsules averaging 15–20 microns in size. This dyeing preparation is deposited on a polyester fabric by xerograph using one of the known methods, for example those given in U.S. Pat. 3,057,719 or British Pat. 843,502. The locally dyed fabric is submitted to dry heat treatment for 1 minute at 200–210° C.

The blue print thus produced is very fast and at the same time a wash resistant finish is imparted to the fabric by the melted polyacrylamide resin. In comparison with the known printing methods for this type of fabric, the print can be produced in a much shorter time and with far less consumption of power since no printing screens or rollers have to be prepared, no printing pastes are needed and the fabric requires no aftertreatment.

EXAMPLE 3

The dyeing preparation of the compoition:

| | Parts |
|---|---|
| Irganol Orange GRLS (C.I. Acid Orange 94) | 40 |
| Rosin | 200 |
| Urea | 50 | described in Example 4 of the published Swiss patent application 5,970/63 has a dielectric constant of about 2–3, while a preparation according to this invention and consisting of

| | Parts |
|---|---|
| Irganol Orange GRLS (C.I. Acid Orange 94) | 40 |
| Ethylene glycol | 20 |
| Urea | 50 |
| Water | 180 | encapsulated in polyethylene terephthalate, has a dielectric constant greater than 50.

For this reason dyeing preparations produced in accordance with this invention give, at constant field intensity, much more sharply defined prints in application by the electrostatic technique.

Moreover this difference in dielectric constant (50–80 as compared with 2–3) permits the field intensity to be reduced while maintaining the quality of the prints, which besides the saving in production costs greatly reduces the danger of dissipating electrical charge.

Having thus disclosed the invention, what I claim is:

1. A process for the dyeing or printing of a textile substrate which comprises electrostatically depositing a dye preparation through air onto said substrate and then fixing the dye, said dye preparation comprising capsules of a high molecular weight dielectric polymer (A) containing a dye (B) suitable for dyeing said substrate in a liquid (C) which has a dielectric constant between 20 and 80 and in which the polymer is virtually free from swelling, and said fixing step comprising melting, splitting, or dissolving the polymer capsule whereby the dye is brought into contact with the textile substrate.

2. A process as in claim 1 in which the polymer (A) encloses a mixture of 1–70% solid dye (B) and 99–30% liquid (C).

3. A process as in claim 1, in which the polymer (A) consists of a polyvinyl chloride, polyacrylic acid, polyacrylic acid ester, polyacrylamide, polyester or polyamide or their mixture.

4. A process as in claim 1 wherein the capsules have a diameter of <50 microns.

5. A process according to claim 1 wherein the encapsulated material includes one or more conventional dyeing assistants selected from the group consisting of dispersing agents, solvents, oxidizing agents, reducing agents, acid donors, alkali donors, and dye carriers.

6. A process according to claim 1 wherein the dye preparation is deposited on the textile substrate by passing it through a screen set at a predetermined distance from said substrate and then through an electrostatic field acting between said screen and said substrate.

7. A process according to claim 1 wherein the polymer (A) is a water-insoluble film-forming polymer or copolymer having an imbibition value of less than 5% at 20° C. and 65% relative humidity.

8. A process according to claim 1 wherein the liquid (C) is water, an alkanol or a water-alkanol mixture.

9. A process according to claim 8 wherein the polymer (A) is polyvinyl chloride, polyacrylic acid, polyester, polyamide or mixtures thereof.

10. A process according to claim 6 which comprises depositing on the textile substrate a dye preparation comprising capsules of a high molecular weight dielectric polymer (A) selected from the group consisting of polyvinyl chloride, polyacrylic acid, polyester, and polyamide.

11. A process according to claim 10 wherein the polymer (A) encloses a mixture of 1–70% dye (B) and 99–30% liquid (C).

References Cited

UNITED STATES PATENTS

| | | | |
|---|---|---|---|
| 2,361,454 | 10/1944 | Cassel | 8—62 |
| 2,376,319 | 5/1945 | Cassel | 8—62 |
| 2,366,347 | 1/1945 | Millson | 8—2 |
| 3,080,318 | 3/1963 | Claus | 252—62.1 |
| 3,135,695 | 6/1964 | York | 252—62.1 |
| 3,454,347 | 7/1969 | Leimbacher | 8—2 |
| 3,503,783 | 3/1970 | Evan | 252—62.1 |

OTHER REFERENCES

Vickerstaff: "The Physical Chemistry of Dyeing," 1954, pp. 61 and 111–113, pub. by Interscience Pub., New York, N.Y.

DONALD LEVY, Primary Examiner

U.S. Cl. X.R.

96—1.2; 252—62.5